Jan. 6, 1931.   F. PORTER   1,787,795
PROCESS FOR REMOVAL OF OXYGEN FROM GASES
Original Filed Aug. 19, 1926
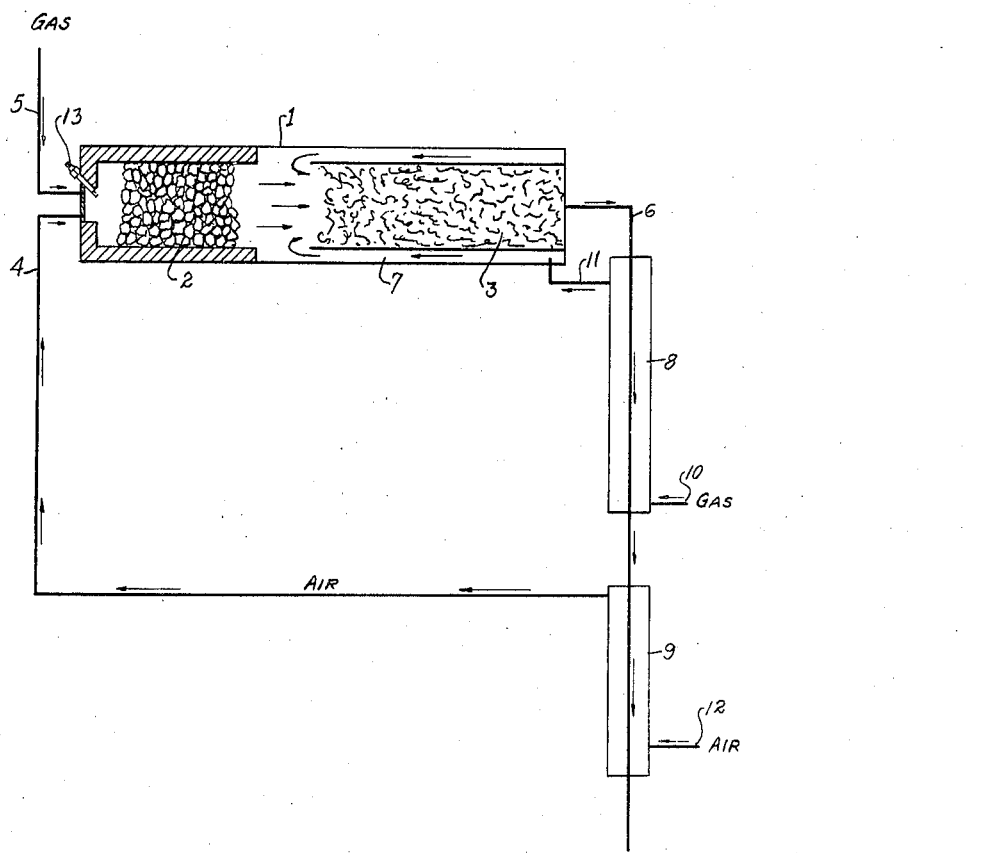
INVENTOR
FRANK PORTER
BY
ATTORNEY Patented Jan. 6, 1931                                            1,787,795

UNITED STATES PATENT OFFICE

FRANK PORTER, OF PONCA CITY, OKLAHOMA, ASSIGNOR TO KAY COUNTY GAS COMPANY, OF PONCA CITY, OKLAHOMA, A CORPORATION OF OKLAHOMA

PROCESS FOR REMOVAL OF OXYGEN FROM GASES

Original application filed August 19, 1926, Serial No. 130,154. Divided and this application filed September 21, 1927. Serial No. 220,952.

This case is a division of my application No. 130,154 filed August 19, 1926.

My invention relates to a process for the removal of uncombined oxygen from gases. In the preferred form of the invention, I accomplish this result in a simple, efficient and inexpensive manner by utilizing the power of oxygen to combine with reactive substances such as carbon monoxide or hydrogen.

I will describe the invention with reference to the removal from a natural gas composed chiefly of methane although the process is directly applicable to other gases and especially to any gas composed mainly of saturated hydrocarbons.

It is a well known fact that methane or its homologues under the same conditions react with oxygen at a much higher temperature than does carbon monoxide, hydrogen or unsaturated hydrocarbons. I have found it preferable to produce substances more reactive than methane from a portion of the saturated hydrocarbons contained in the gas from which the oxygen is to be removed by burning incompletely with air.

The reactions by which carbon monoxide and hydrogen are produced from methane or other saturated hydrocarbons and air, while somewhat analogous to the "producer gas" and "water gas" reactions of air and steam with carbon, are at present not so well understood as the latter. For the purpose of illustration, I may give as a possible course of one of the reactions, the equation:

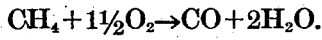

Since some hydrogen is found in the gases I may also postulate another equation:

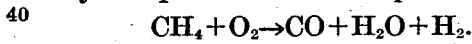

The reactions by which carbon monoxide and hydrogen are produced take place at a comparatively high temperature ordinarily between 800° to 2000° C. I have found it preferable to cause the reaction to take place over lump pumice stone, earthenware, or other porous refractory substances offering a large surface.

The hot gases resulting from the incomplete combustion of part of the gas with air as described above may then be mixed with the main portion of the gas from which the oxygen is to be removed, and the resulting mixture passed over metallic copper in a form such as copper turnings, copper filings, or other finely divided copper. I have found copper to be a suitable catalyst although other metals, such as iron, may be substituted.

In the presence of this catalyst, the oxygen combines with the carbon monoxide and hydrogen at a comparatively low temperature. I have found that approximately 400° C. to 500° C. is sufficient, although the invention is not limited to this temperature range.

In addition I have found that hydrogen sulfide and other corrosive sulfur compounds that are present in the natural gas are destroyed by the process here described. The removal of sulfur compounds may therefore be mentioned as a further object in the invention.

The drawing is a diagrammatical view of an apparatus embodying the features of this invention.

1 designates a conductor in the form of a double chamber containing a catalyst 2 for promoting the production of the carbon monoxide and hydrogen. This catalyst may be any of the porous refractory substances to which I have already referred. Another section of the chamber contains a catalyst 3, preferably metallic copper, for promoting the combustion of the carbon monoxide and hydrogen with oxygen in the main portion of the gas.

Air and gas are supplied from any convenient source to the inlet end of this chamber through pipes 4 and 5, and the ultimate mixture is discharged through a pipe 6 leading from the other end of said chamber. The catalyst 3 lies between the catalyst 2 and the outlet of the chamber.

The main body of gas to be treated may be supplied through a duct 7 surrounding the catalyst 3 and terminating between the two masses of catalytic material to provide for the admission of the gas at this point. Heat exchangers 8 and 9 may be formed around the pipe 6 through which the hot gases are discharged. The main body of gas is transmitted from a supply pipe 10, through the heat exchanger 8, and thence through pipe 11 to the duct 7. The gas is thus preheated before it enters the reaction chamber. The air may be supplied through a pipe 12 leading to the heat exchanger 9, and thence through pipe 4 to the inlet of the reaction chamber.

The reaction may be started by means of any suitable ignition device, such as a spark plug 13.

The temperature in the combustion zone at the catalyst 2 is preferably above 700° C., for example, between 800° and 2000° C., so as to produce the substances more reactive toward oxygen than the saturated hydrocarbons, but the temperature in the reaction zone at the catalyst 3 may be much lower, for example, between 300° C. and 500° C. The main body of gas entering through the duct 3 is therefore subjected to the desired reaction for the removal of oxygen at a relatively low temperature, and in a very effective and inexpensive manner.

It is to be understood that this process can be carried out continuously by merely maintaining a predetermined delivery of gas and air to the system.

I claim:

1. The process of removing oxygen from natural gas which comprises causing the natural gas to react with air at a high temperature to produce substances more reactive toward oxygen than saturated hydrocarbons, commingling the more reactive resultant gases with a body of the natural gas to be treated, and causing a union of oxygen contained in the gas with said more reactive substances.

2. The process of removing oxygen from natural gas which comprises causing the natural gas to react with air at a high temperature to produce substances more reactive toward oxygen than saturated hydrocarbons, commingling the more reactive resultant gases with a body of the natural gas to be treated, and subjecting the mixture to a lower temperature in the presence of a catalyst promoting the union of the oxygen contained in the gas with said more reactive substances.

3. The process for the removal of oxygen from natural gas which comprises causing a portion of the gas to react with air at a high temperature to produce a more reactive gas mixture containing carbon monoxide and hydrogen in a more unstable combination, mixing said gas mixture with the main portion of the gas to be processed, passing the whole resulting gas mixture over metallic copper, at a lower temperature, and interchanging the heat of the processed gas with the unprocessed gas.

4. The process of removing oxygen from natural gas which comprises subjecting a mixture of said gas and air to temperatures of from 700° C. to 2000° C. to produce substances reactive toward oxygen, commingling said substances with a body of the natural gas to be treated, and subjecting the resultant mixture to temperatures of from 300° C. to 500° C. to remove the oxygen from said natural gas.

In testimony that I claim the foregoing I hereunto affix my signature.

FRANK PORTER.